(12) United States Patent
Yokawa et al.

(10) Patent No.: US 9,195,084 B2
(45) Date of Patent: Nov. 24, 2015

(54) DISPLAY DEVICE AND TELEVISION

(71) Applicant: Funai Electric Co., Ltd., Daito-shi, Osaka (JP)

(72) Inventors: Akira Yokawa, Daito (JP); Yuki Kita, Daito (JP); Akihiro Fujikawa, Daito (JP); Yasuyuki Fukumoto, Daito (JP); Yasuhiro Mori, Daito (JP); Yuto Suzuki, Daito (JP); Hirofumi Horiuchi, Daito (JP); Hirohiko Tsuji, Daito (JP); Takahito Yamanaka, Daito (JP); Hideo Yonezawa, Daito (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 359 days.

(21) Appl. No.: 13/652,578

(22) Filed: Oct. 16, 2012

(65) Prior Publication Data

US 2013/0107127 A1    May 2, 2013

(30) Foreign Application Priority Data

Oct. 26, 2011  (JP) .................................. 2011-234735

(51) Int. Cl.
 *H04N 7/00* (2011.01)
 *G02F 1/1333* (2006.01)
 *G06F 1/16* (2006.01)
 *H04N 5/655* (2006.01)

(52) U.S. Cl.
 CPC ........ *G02F 1/133308* (2013.01); *G06F 1/1601* (2013.01); *H04N 5/655* (2013.01); *G02F 2001/133314* (2013.01); *G02F 2001/133334* (2013.01)

(58) Field of Classification Search
 USPC .......................................................... 348/836
 See application file for complete search history.

(56) References Cited

U.S. PATENT DOCUMENTS

| 7,864,516 | B2 * | 1/2011 | Lee et al. ................. 361/679.21 |
| 2003/0112380 | A1 * | 6/2003 | Lee et al. ...................... 348/836 |
| 2006/0268193 | A1 | 11/2006 | Wang et al. |
| 2011/0199725 | A1 * | 8/2011 | Oh ........................... 361/679.01 |
| 2011/0216482 | A1 * | 9/2011 | Moscovitch et al. .... 361/679.01 |
| 2012/0020046 | A1 | 1/2012 | Takashima |

FOREIGN PATENT DOCUMENTS

| JP | 2000-200046 A | 7/2000 |
| WO | 2011/112206 A1 | 9/2011 |

OTHER PUBLICATIONS

Official Communication issued in corresponding European Patent Application No. 12189655.9, mailed on Jan. 18, 2013.

* cited by examiner

*Primary Examiner* — Hee-Yong Kim
(74) *Attorney, Agent, or Firm* — Keating & Bennett, LLP (57) ABSTRACT

A display device that prevents unnecessary radiation emitted from a circuit that drives a display panel from leaking to outside while achieving a reduction in the size of a cover member includes a liquid crystal panel, a drive circuit that drives the liquid crystal panel that is disposed on a rear surface of the liquid crystal panel, a rear frame in which the outer peripheral portion and an area around the outer peripheral portion other than the central portion constitute a rear case and which is made of a conductive material that covers, in the region constituting the rear case, sides and a rear of the drive circuit board disposed on the rear surface of the liquid crystal panel, and a cover member that covers from the rear the area of the rear frame other than the region constituting the rear case.

11 Claims, 10 Drawing Sheets

DISPLAY DEVICE AND TELEVISION

BACKGROUND OF THE INVENTION

1. Field of the Invention

The present invention relates to a display device and a television, and more particularly to a display device and a television comprising a display panel.

2. Description of the Related Art

Display devices including a display panel have been known in the past (for example, see Japanese Patent Application Laid-Open Publication No. 2000-200046).

Japanese Patent Application Laid-Open Publication No. 2000-200046 discloses a display device including a plasma display panel (hereinafter referred to as PDP) (display panel), a plate-shaped chassis disposed behind the PDP so as to cover the rear surface of the PDP, a circuit board for digital signal processing that is attached to the rear surface of the chassis, and a conductive back cover (cover member) that is arranged so as to cover the rear and sides of the chassis and that constitutes a rear case. Here, although not described in Japanese Patent Application Laid-Open Publication No. 2000-200046, it is considered that a circuit that drives the PDP is provided on the rear surface of the PDP separately from the aforementioned circuit board for digital signal processing and that the rear of the circuit that drives the PDP is covered by the plate-shaped chassis. Then, it is considered that as a result of the conductive back cover covering the rear and the sides of the chassis, the sides of the PDP drive circuit board are covered. With such a configuration, it is considered that in Japanese Patent Application Laid-Open Publication No. 2000-200046, both the plate-shaped chassis and the back cover are used to cover the sides and the rear of the drive circuit board on the rear surface of the PDP, thus inhibiting unnecessary radiation (EMI) emitted from the PDP drive circuit board from leaking to the outside.

However, in the display device described in Japanese Patent Application Laid-Open Publication No. 2000-200046, while unnecessary radiation emitted from the circuit that drives the PDP can be inhibited from leaking to the outside, it is necessary to cover the rear of the PDP drive circuit board with the plate-shaped chassis and also to cover the sides of the PDP drive circuit board by covering the rear and the sides of the chassis with the conductive back cover. Therefore, the back cover constituting the rear case must be made larger in order to cover the rear and the sides of the chassis. Because of this, it is difficult to reduce the size of the back cover.

SUMMARY OF THE INVENTION

Accordingly, preferred embodiments of the present invention provide a display device and a television that prevent unnecessary radiation (EMI) emitted from the circuit board that drives the display panel from leaking to the outside while achieving a size reduction of the cover member.

A display device according to a first preferred embodiment of the present invention includes a display panel, a first circuit board that drives the display panel and that is disposed on the rear surface of the display panel, a rear frame in which the outer peripheral portion and an area around the outer peripheral portion other than the central portion constitute a rear case and which is composed of a conductive material that covers, in the region constituting the rear case, the sides and the rear of the first circuit board disposed on the rear surface of the display panel, and a cover member that covers from the rear the area of the rear frame other than the region constituting the rear case.

In the display device according to the first preferred embodiment of the present invention, as was described above, by providing a rear frame that is preferably made of a conductive material that covers, in the region constituting the rear case, the sides and the rear of the first circuit board that drives the display panel disposed on the rear surface of the display panel, the sides and the rear of the first circuit board are covered by the rear frame, so it is possible to prevent unnecessary radiation emitted from the first circuit board from leaking to the outside. Consequently, there is no need to cover the first circuit board with the cover member provided behind the rear frame, so the size of the cover member can be reduced. Specifically, because it is possible to provide a cover member that covers only the area of the rear frame other than the region constituting the rear case, a size reduction of the cover member can be achieved. Accordingly, in this display device, unnecessary radiation emitted from the first drive circuit that drives the display panel can be prevented from leaking to the outside while achieving a reduction in the size of the cover member.

In the display device according to the first preferred embodiment, it is preferable that the rear frame include a through-hole arranged to allow a wiring line connected to the first circuit board to pass from the front side to the rear side of the rear frame, and that the through-hole be provided in a position that does not overlap with the first circuit board as seen from the rear and in an area that is covered by the cover member from the rear. If such a configuration is adopted, even if a through-hole arranged to allow a wiring line connected to the first circuit board to pass is provided in the rear frame, unnecessary radiation emitted from the first circuit board can be prevented from leaking to the outside via the through-hole, so it is possible to prevent a decrease in the shielding function of the rear frame. Furthermore, the through-hole can be covered over by the cover member.

In this case, it is preferable that the display device also include a second circuit board that is attached to an area of the rear surface of the rear frame other than the region constituting the rear case and that is covered by the cover member from the rear, and that the wiring line be configured so as to connect the first circuit board disposed on the front side of the rear frame and the second circuit board attached to the rear surface of the rear frame to each other via the through-hole. With such a configuration, the first circuit board disposed on the front side of the rear frame and the second circuit board attached to the rear surface of the rear frame can be connected easily via the through-hole by the wiring line, and both the through-hole and the second circuit board attached to the rear surface of the rear frame can be covered over by the cover member.

In the display device according to the first preferred embodiment, it is preferable that the rear frame be arranged such that the outer peripheral portion constituting the rear case extends forward and be configured so as to cover the sides of the first circuit board with the outer peripheral portion and also so as to cover the rear of the first circuit board with the area around the outer peripheral portion constituting the rear case. If such a configuration is adopted, both the sides and the rear of the first circuit board are covered easily by the region constituting the rear case (the outer peripheral portion and the area around the outer peripheral portion), which makes it possible to effectively prevent unnecessary radiation from leaking to the outside, so the shielding function can be improved.

In the display device according to the first preferred embodiment, it is preferable that the rear frame be made of a sheet metal, include a first constricted portion having a concave shape that sinks in toward the rear in the area around the outer peripheral portion constituting the rear case, and be configured so as to cover from the rear the first circuit board by using the first constricted portion having a concave shape. With such a configuration, the mechanical strength of the area around the outer peripheral portion of the rear frame is increased by the first constricted portion, so in the region of the rear frame constituting the rear case, unnecessary radiation can be prevented from leaking to the outside while ensuring the strength required as the rear case. Moreover, by providing the first constricted portion having a concave shape that sinks in toward the rear, even in cases where the first circuit board is disposed so as to protrude rearward, it is possible to easily cover the first circuit board disposed in a protruding manner by means of the concave-shaped first constricted portion.

In this case, it is preferable that the display panel have a rectangular or substantially rectangular shape in plan view, that the first circuit board be disposed so as to extend along one side of the rectangular or substantially rectangular display panel, and that the first constricted portion of the rear frame be arranged so as to extend in the direction of extension of the first circuit board. If such a configuration is adopted, even in cases where the first circuit board that extends along one side of the display panel is disposed so as to protrude rearward, the first circuit board can be reliably covered from the rear by the first constricted portion, so it is possible to prevent unnecessary radiation (EMI) emitted from the first circuit board from leaking to the outside.

In the configuration in which the aforementioned display panel has a rectangular or substantially rectangular shape, it is preferable that a second constricted portion that extends in the direction of extension of the first constricted portion be provided on the bottom portion of the first constricted portion. With such a configuration, even in cases where the surface area of the bottom portion of the first constricted portion is increased, causing the bottom portion to be easily deformed, the mechanical strength of the bottom portion is increased by the second constricted portion, so it is possible to prevent the deformation of the bottom portion of the first constricted portion around the outer peripheral portion constituting the rear case and to ensure the strength required as the rear case.

In the display device according to the first preferred embodiment, it is preferable that the display device further include an optical member disposed on the rear surface of the display panel and a support member that supports the optical member from the rear, that the first circuit board be attached to the rear surface of the support member, and that the rear frame be configured so as to cover the sides and the rear of the first circuit board attached to the rear surface of the support member with the region constituting the rear case. If such a configuration is adopted, it is possible to support the first circuit board in a stable manner via the support member and also to prevent unnecessary radiation emitted from the first circuit board from leaking to the outside by covering the stably supported first circuit board with the rear frame.

A television according to a second preferred embodiment of the present invention includes a receiver capable of receiving a television broadcast, a display panel capable of displaying the television broadcast received by the receiver, a circuit that drives the display panel that is disposed on the rear surface of the display panel, a rear frame in which the outer peripheral portion and an area around the outer peripheral portion other than the central portion constitute a rear case and which is made a conductive material that covers, in the region constituting the rear case, the sides and the rear of the circuit board disposed on the rear surface of the display panel, and a cover member that covers from the rear the area of the rear frame other than the region constituting the rear case.

In the television according to the second preferred embodiment, as was described above, by providing a rear frame which is made of a conductive material that covers, in the region constituting the rear case, the sides and the rear of the circuit that drives the display panel disposed on the rear surface of the display panel, both the sides and the rear of the circuit board are covered by the rear frame, thus making it possible to prevent unnecessary radiation emitted from the circuit board from leaking to the outside. Consequently, because it is not necessary to cover the circuit board with the cover member provided behind the rear frame, the size of the cover member can be reduced. That is, because it is possible to provide a cover member that covers only the area of the rear frame other than the region constituting the rear case, the cover member can be reduced in size. Accordingly, in this television, unnecessary radiation emitted from the circuit that drives the display panel can be prevented from leaking to the outside while achieving a reduction in the size of the cover member.

With various preferred embodiments of the present invention, as was described above, it is possible to prevent unnecessary radiation emitted from the circuit that drives the display panel from leaking to the outside while achieving a size reduction of the cover member.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described below based on figures.

The configuration of the liquid crystal television 100 according to a preferred embodiment of the present invention will be described with reference to FIGS. 1 through 10. Note that in the present preferred embodiment, a description will be given regarding a non-limiting example in which "display device" and "television" of the present invention are applied to the liquid crystal television 100.

Figure 1:
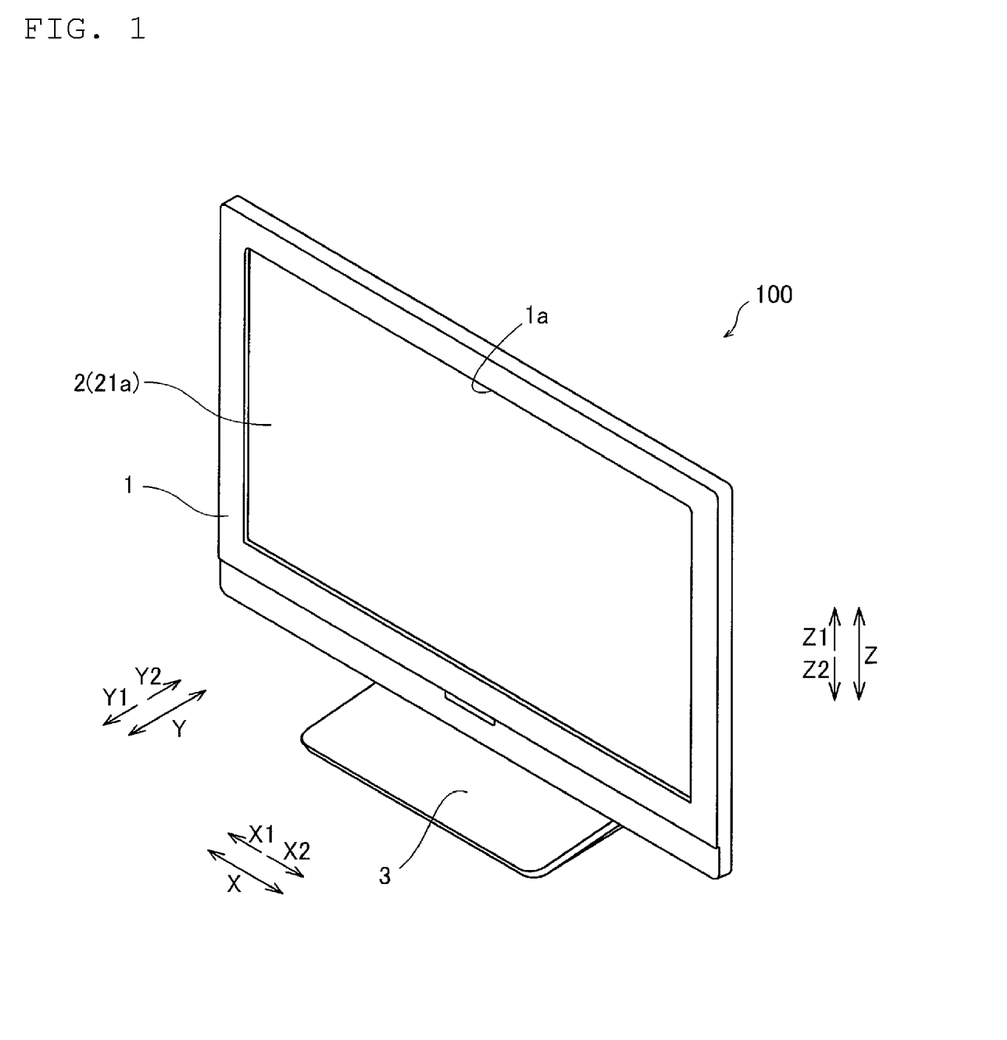
FIG. 1 is an overall perspective view of the liquid crystal television according to a preferred embodiment of the present invention as seen from the front.
Figure 2:
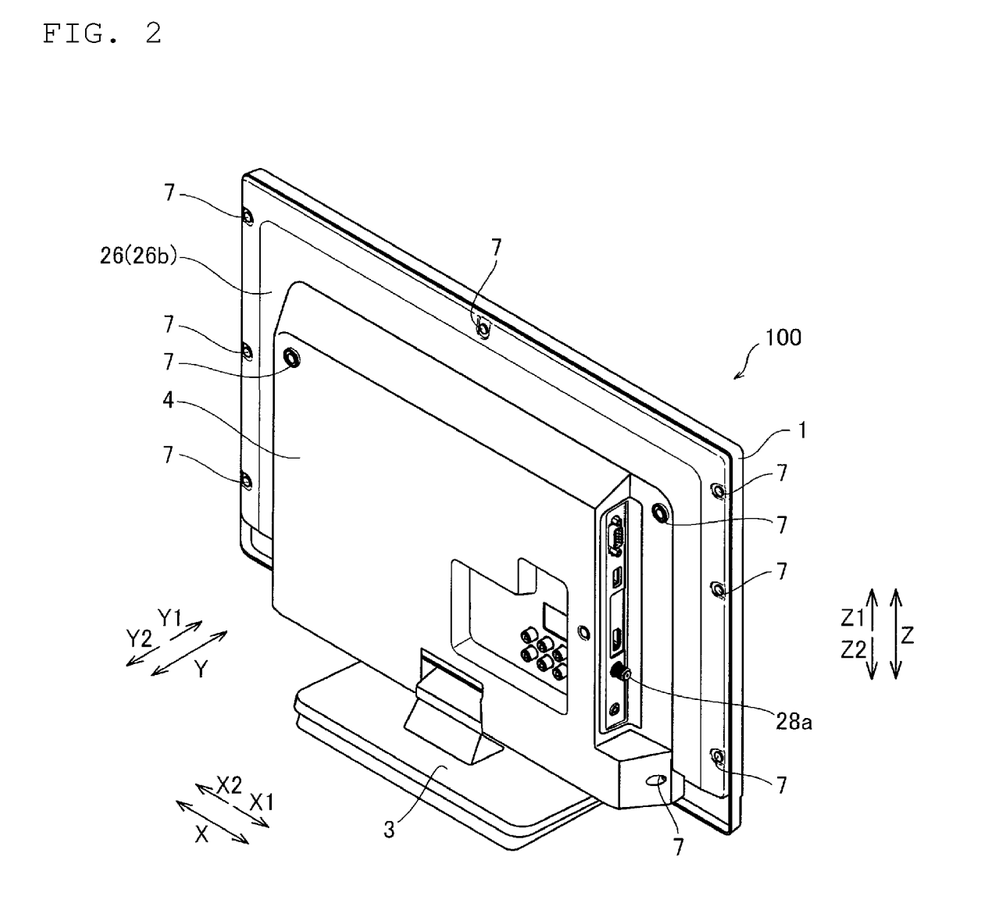
FIG. 2 is an overall perspective view of the liquid crystal television according to a preferred embodiment of the present invention as seen from the rear side.

The liquid crystal television 100 according to one preferred embodiment of the present invention includes a frame-shaped front case 1, a liquid crystal module 2 disposed on the rear side (Y2 direction side) of the front case 1, and a stand member 3 that supports the entire liquid crystal television 100 as shown in FIGS. 1 and 2.

Figure 3:
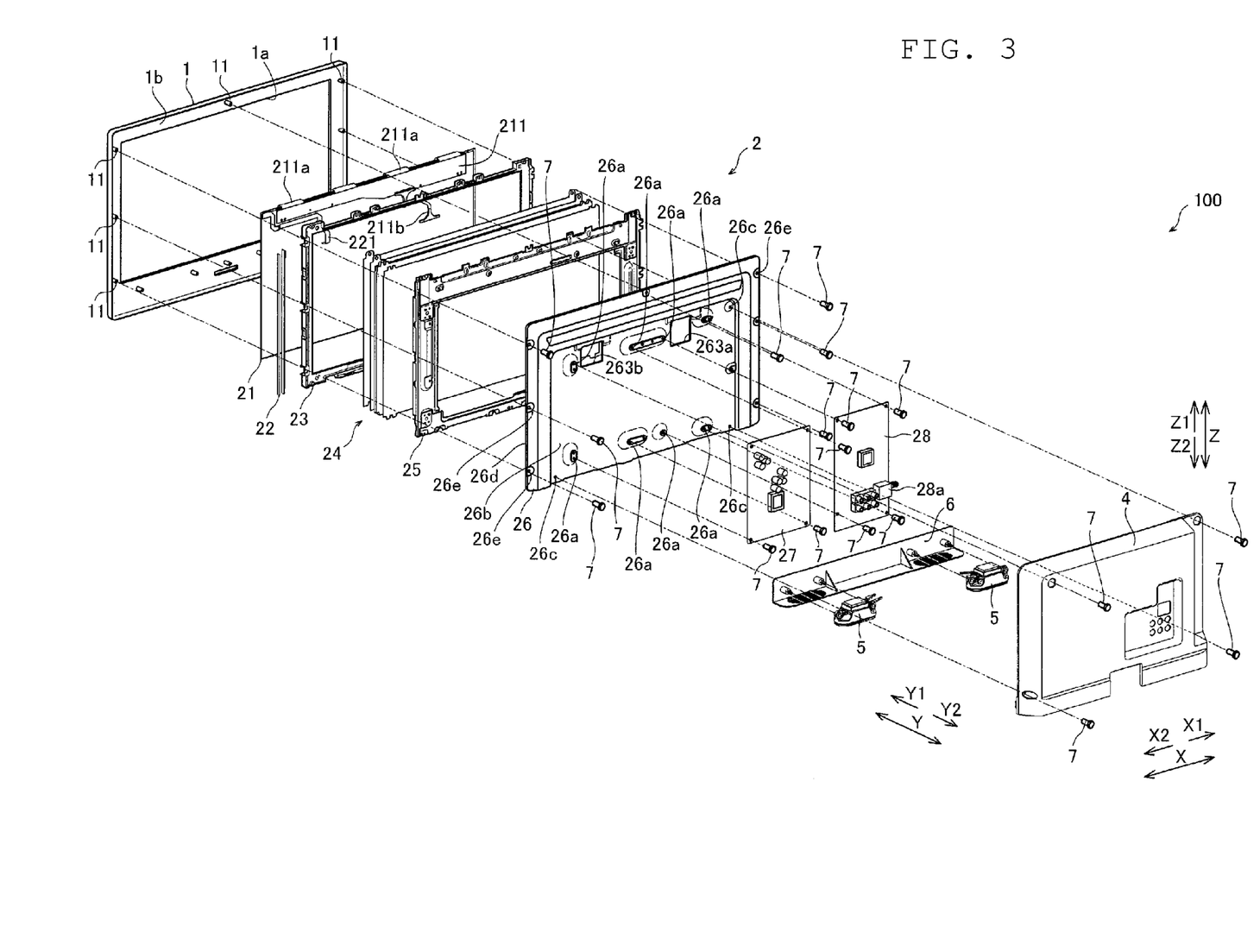
FIG. 3 is an exploded perspective view showing the liquid crystal television according to a preferred embodiment of the present invention.

The front case 1 includes a rectangular or substantially rectangular opening 1a that exposes a rectangular or substantially rectangular display region 21a (see FIG. 1) of the liquid crystal module 2 as shown in FIGS. 1 and 3. Furthermore, a plurality of screw engagement portions 11 are preferably integral with the front case 1 on the inner surface 1b (the surface on the Y2 direction side) of the front case 1 along the edge portion as shown in FIG. 3.

The liquid crystal module 2 includes a liquid crystal panel 21, a light source 22, a resin frame 23, the optical members 24, a frame-shaped hold plate 25, and a rear frame 26 as shown in FIG. 3. In concrete terms, the hold plate 25, the optical members 24, the frame-shaped resin frame 23, and the liquid crystal panel 21 are disposed in this order from the rear frame 26 toward the direction of the front case 1 (arrow Y1 direction). Moreover, the light source 22 preferably configured by a plurality of LEDs is disposed on the side surface on the X2 direction side of the resin frame 23. Note that the liquid crystal panel 21 is one example of a "display panel" according to a preferred embodiment of the present invention, and the hold plate 25 is one example of a "support member" according to a preferred embodiment of the present invention.

The liquid crystal panel 21 constitutes the liquid crystal display panel and preferably includes a liquid crystal cell, an electrode sheet, and the like. In addition, the liquid crystal panel 21 is configured so as to be driven in accordance with a television broadcast received by a receiver (tuner) 28a (described later) and display the television broadcast. Furthermore, the liquid crystal panel 21 preferably has a rectangular or substantially rectangular shape in plan view as shown in FIG. 3. Moreover, the liquid crystal panel 21 is configured such that the edge portion on the front surface side (Y1 direction side) is pressed by a bezel (not illustrated). Note that the bezel is preferably made of a sheet metal having a substantially cross-sectional L shape and configured so as to press the front surface side of the liquid crystal panel 21 by sandwiching the edge portion of the liquid crystal panel 21 between the bezel and the resin frame 23.

Figure 4:
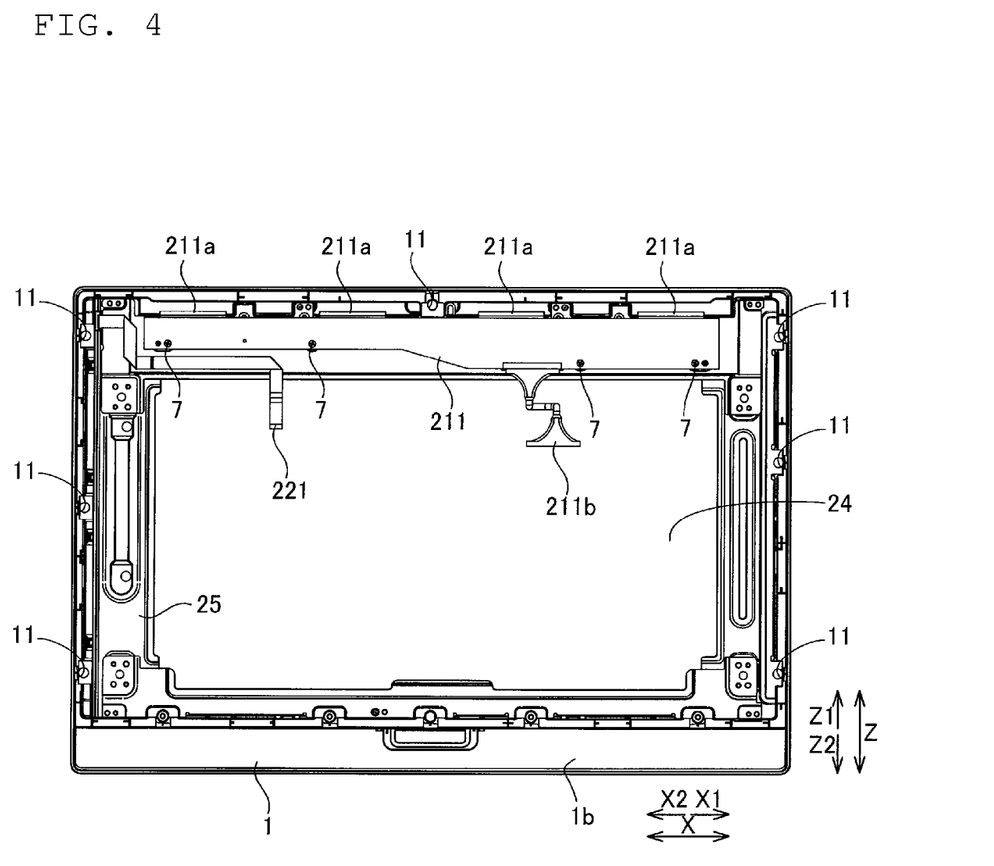
FIG. 4 is a diagram of the liquid crystal television according to a preferred embodiment of the present invention as seen from the rear in a state in which the rear frame is removed.
Figure 5:
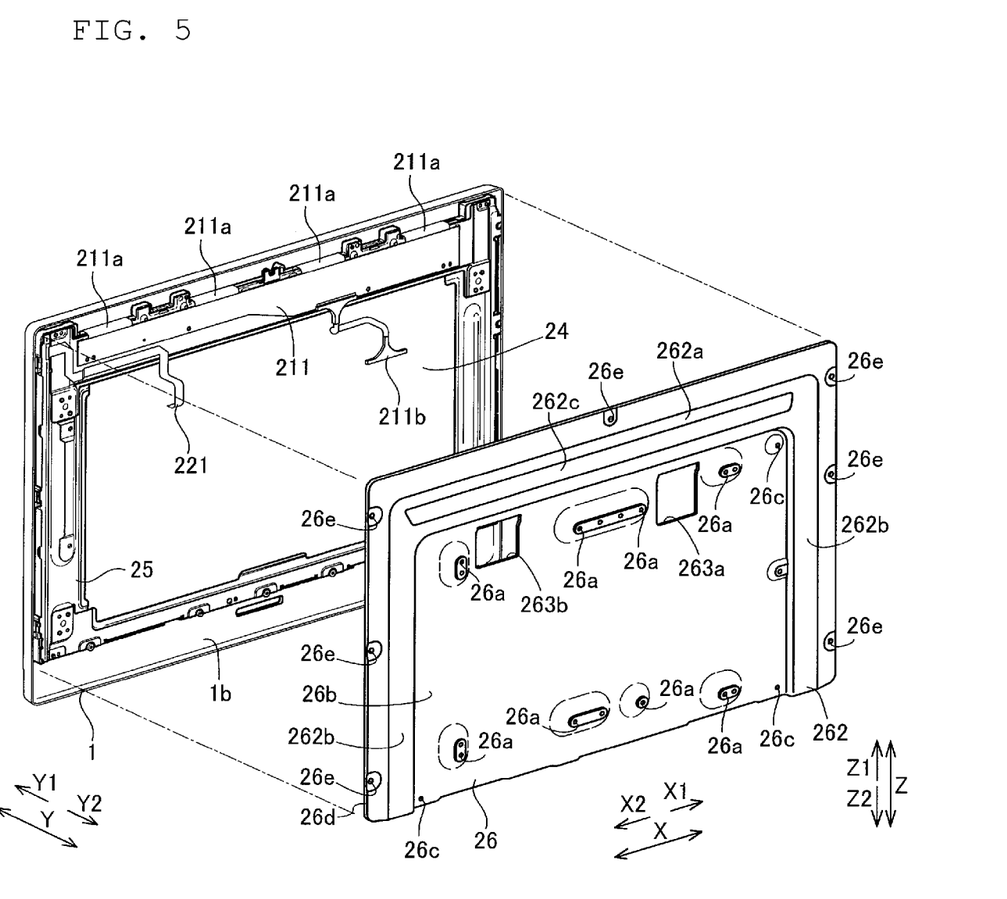
FIG. 5 is a schematic perspective view showing the liquid crystal television according to a preferred embodiment of the present invention in a state in which the rear frame is removed.
Figure 9:
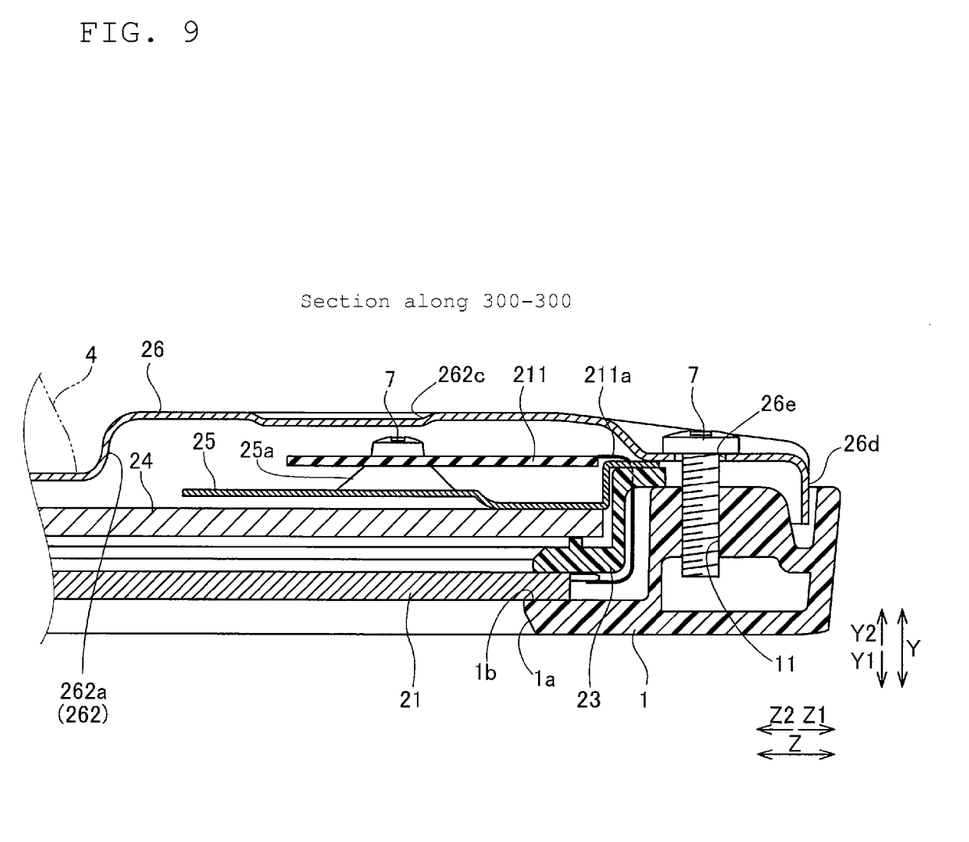
FIG. 9 is a sectional view along line 300-300 in FIG. 8.

A drive circuit board 211 that drives the liquid crystal panel 21 is attached to the liquid crystal panel 21 as shown in FIG. 3. The drive circuit board 211 is disposed so as to extend in the X direction along one side on the upper side (Z1 direction side) of the rectangular or substantially rectangular liquid crystal panel 21. In addition, the drive circuit board 211 is connected to the liquid crystal panel 21 preferably by a plurality of flexible cables 211a and disposed on the rear surface of the liquid crystal panel 21. In concrete terms, as is shown in FIGS. 4 and 5, the drive circuit board 211 is configured so as to be attached by, for example, screws 7 to the rear surface (the surface on the Y2 direction side) of the frame-shaped hold plate 25 disposed to the rear of the liquid crystal panel 21 as a result of the flexible cables 211a being bent in the shape of the letter U. To elaborate this, as is shown in FIG. 9, the drive circuit board 211 is configured so as to be attached by the screws 7 to a board attachment portion 25a that protrudes to the rear of the hold plate 25. Thus, the drive circuit board 211 is disposed in a state in which the drive circuit board 211 protrudes rearward from the hold plate 25. Note that the drive circuit board 211 is one example of a "first circuit board" and "circuit board" according to a preferred embodiment of the present invention.

The resin frame 23 preferably has a frame shape and is configured so as to support the edge portion of the liquid crystal panel 21 from the rear side (Y2 direction side) as shown in FIG. 3. The optical members 24 are disposed on the rear surface of the liquid crystal panel 21 and preferably include an optical reflective sheet, a light guide plate, a diffusion sheet, a lens sheet, and the like. Furthermore, the optical members 24 are held by being sandwiched between the resin frame 23 and the hold plate 25. The hold plate 25 is configured so as to support the optical members 24 from the rear. Moreover, the hold plate 25 is preferably made of a sheet metal (SECC (electro-galvanized steel sheet)) and configured so as to function as a heatsink that radiates the heat of the light source 22.

Figure 6:
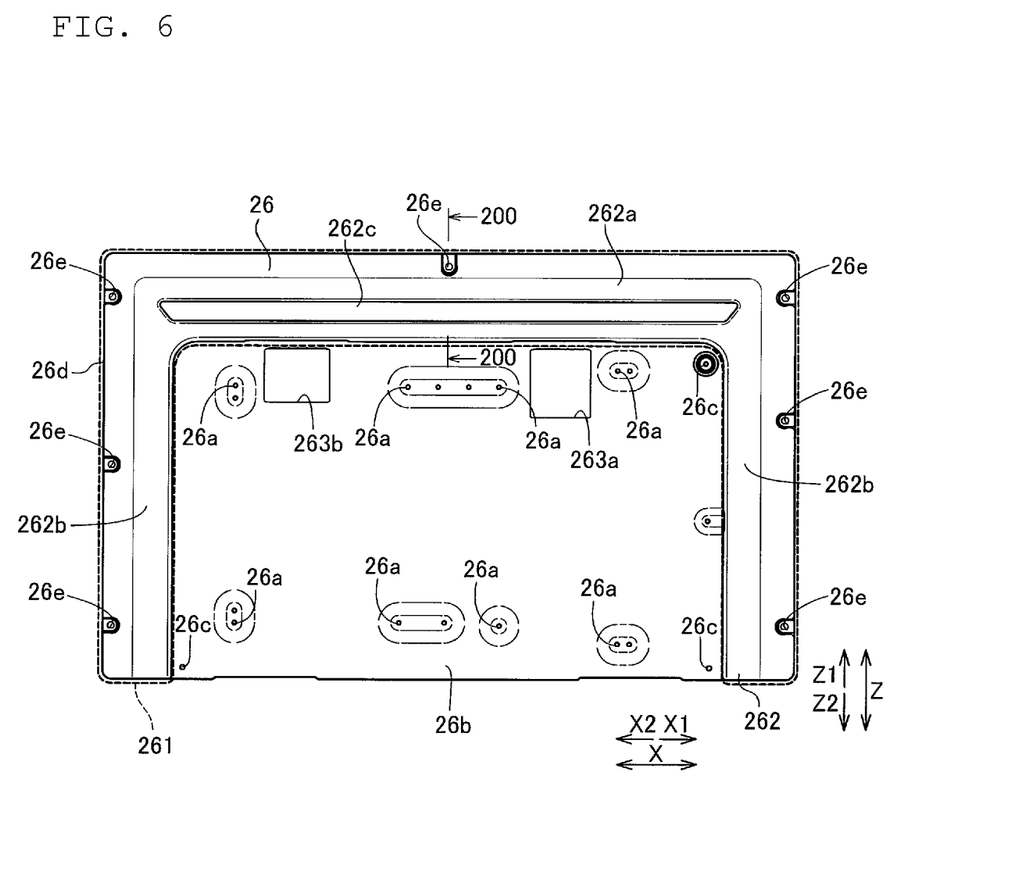
FIG. 6 is a plan view showing rear surface of the rear frame of the liquid crystal television according to a preferred embodiment of the present invention.

The rear frame 26 is preferably made of SECC (electro-galvanized steel sheet) which is a conductive sheet metal and preferably has a rectangular or substantially rectangular shape in plan view as shown in FIGS. 3, 5, and 6. In addition, the rear frame 26 includes a plurality of board attachment screw holes 26a. Consequently, a circuit board 27 (see FIG. 3) that supplies power to the entire device and a circuit board 28 (see FIG. 3) that performs signal processing and is provided with the receiver (tuner) 28a capable of receiving television broadcast can be attached to the central portion of the rear surface 26b (the surface on the Y2 direction side) of the rear frame 26. Note that the circuit board 28 is one example of a "second circuit board" according to a preferred embodiment of the present invention.

Furthermore, the rear frame 26 includes a plurality of cover attachment screw holes 26c and is configured such that a cover member 4 (see FIGS. 2 and 3) preferably has a concave shape so as to cover the circuit boards 27 and 28 can be attached. In concrete terms, the rear frame 26 is configured such that the central portion of the rear surface 26b is covered by the cover member 4. In other words, the outer peripheral portion 26d and a U-shaped region 261 (see FIG. 6) around the outer peripheral portion of the rear frame 26 other than the central portion are exposed, so the rear case of the liquid crystal television 100 is configured from the cover member 4 and the region 261 of the rear frame 26 other than the central portion. Specifically, the circuit boards 27 and 28 are attached to an area of the rear frame 26 other than the region 261 constituting the rear case, and the cover member 4 covers from the rear the area of the rear frame 26 other than the region 261 constituting the rear case. Moreover, the rear frame 26 can radiate the heat of the light source 22 transmitted via the hold plate 25 and heat of electronic components mounted on the circuit boards 27 and 28 effectively via the exposed region 261 constituting the rear case.

In addition, as is shown in FIGS. 3, 5, and 6, a plurality of screw insertion holes 26e into which a plurality of screws 7 (see FIG. 3) can be inserted are provided in the region 261 (see FIG. 6) of the rear frame 26 constituting the rear case. The rear frame 26 is configured so as to be attached to the front case 1 as a result of the screws 7 that are inserted into the screw insertion holes 26e being screwed to the screw engagement portions 11 of the front case 1 as shown in FIG. 3. Furthermore, two speakers 5 are preferably provided on the side of the rear surface 26b of the rear frame 26. The speakers 5 are configured so as to be held by being sandwiched between the rear frame 26 and the cover member 4 via a speaker attachment member 6.

Figure 7:
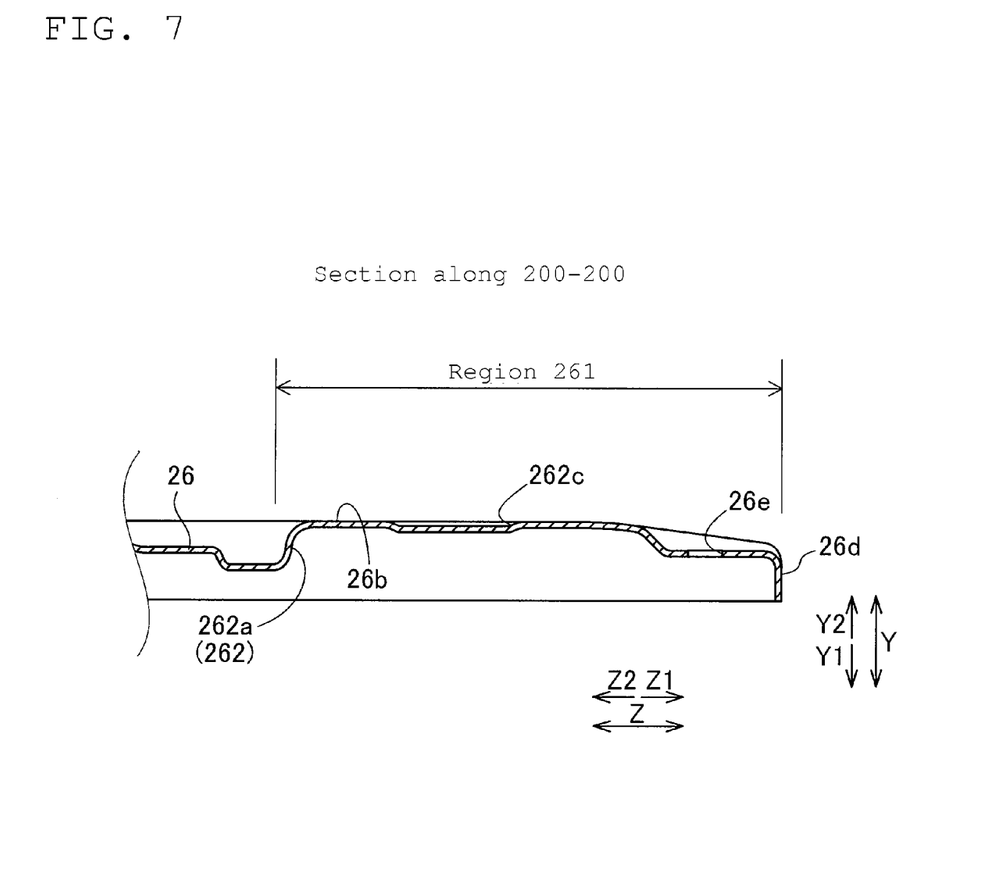
FIG. 7 is a sectional view along line 200-200 in FIG. 6.
Figure 8:
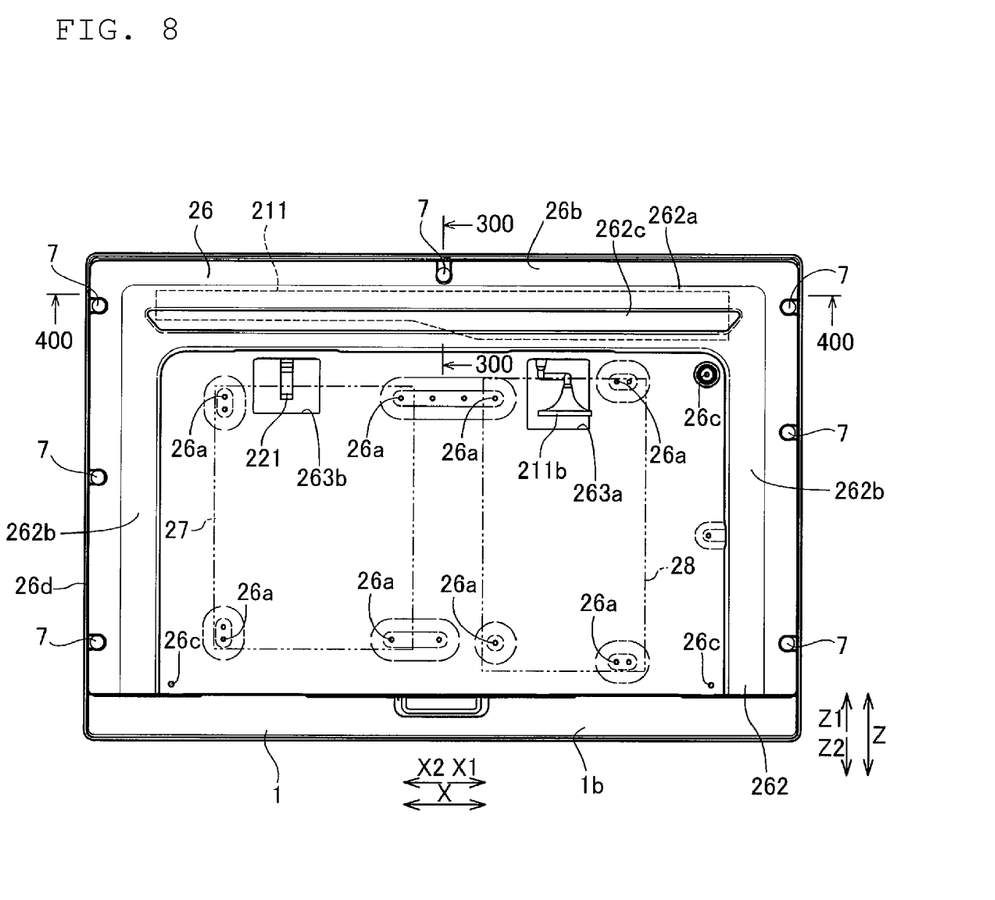
FIG. 8 is a diagram of the liquid crystal television according to a preferred embodiment of the present invention as seen from the rear in a state in which the rear frame is attached.
Figure 10:
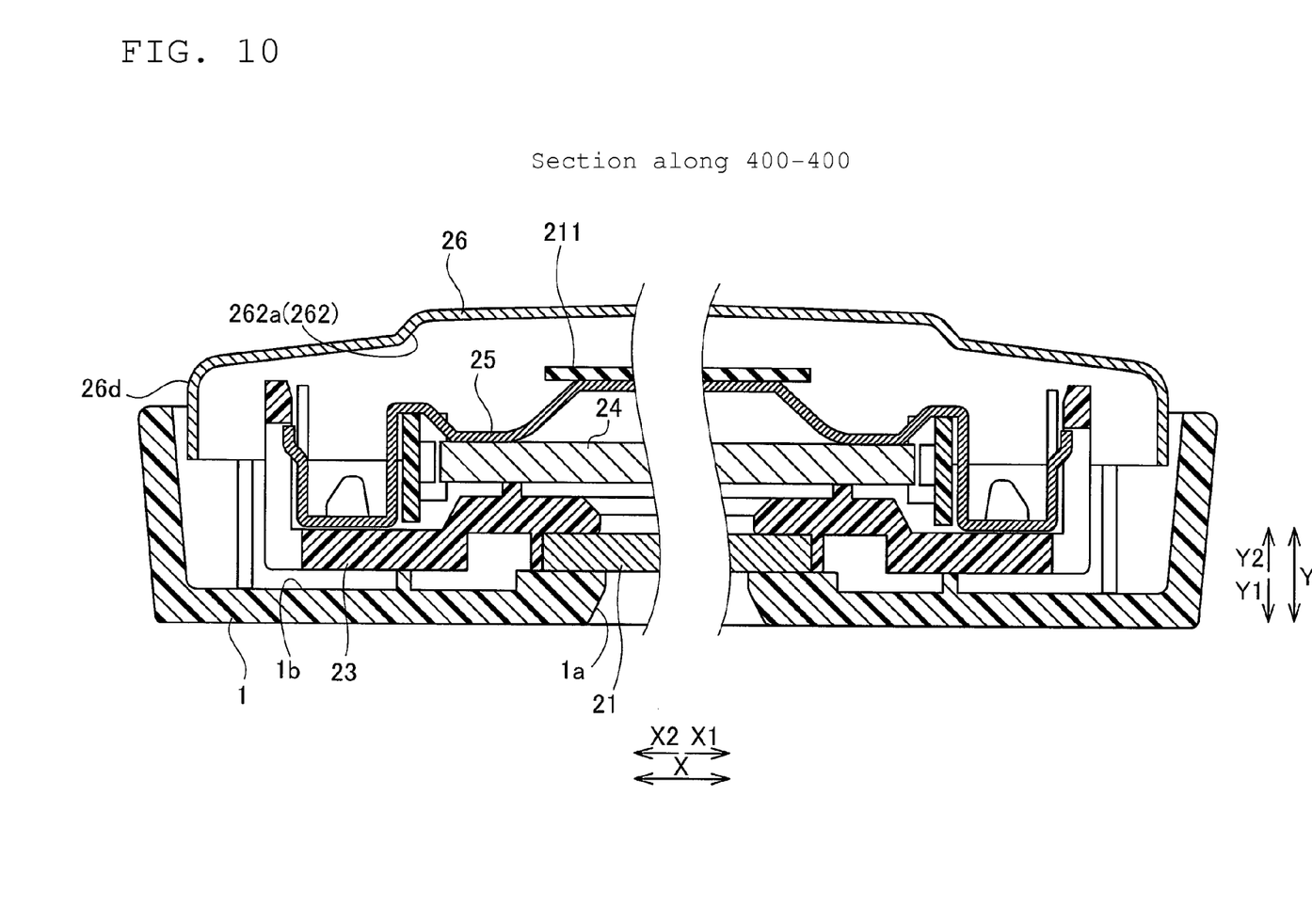
FIG. 10 is a sectional view along line 400-400 in FIG. 8.

Here, in the present preferred embodiment, as is shown in FIGS. 5 and 8 through 10, the rear frame 26 is configured so as to cover, in the region 261 (see FIG. 6) of the rear frame 26 constituting the rear case, the sides and the rear of the drive circuit board 211 attached to the rear surface of the hold plate 25. To elaborate this, the rear frame 26 is arranged so as to have a circumferentially-shaped side surface as a result of the outer peripheral portion 26*d* being bent and extending forward (Y1 direction) as shown in FIGS. 5, 7, 9, and 10. Furthermore, the rear frame 26 has a constricted portion 262 preferably having a concave shape that sinks in toward the rear (Y2 direction) in an area around the outer peripheral portion constituting the rear case as shown in FIGS. 6 and 7. The constricted portion 262 is preferably formed in the shape of the letter U as seen from the rear along the inner edge portion of the U-shaped region 261 constituting the rear case as shown in FIG. 6. Moreover, a portion 262*a* of the constricted portion 262 on the upper side (Z1 direction side) is arranged so as to extend in the direction of extension of the drive circuit board 211 (X direction). In addition, the side portions 262*b* of the constricted portion 262 are arranged so as to extend in the up-down direction (Z direction). Furthermore, a bottom constricted portion 262*c* that extends in the direction of extension of the constricted portion 262 (X direction) is provided on the bottom portion of the upper-side (Z1 direction-side) portion 262*a* of the constricted portion 262 as shown in FIGS. 5 through 7. With such a configuration, as is shown in FIGS. 8 through 10, the rear frame 26 can cover the rear of the drive circuit board 211 that is attached so as to protrude rearward by using the upper-side (Z1 direction-side) portion 262*a* of the constricted portion 262 arranged around the outer peripheral portion constituting the rear case and also cover the sides of the drive circuit board 211 by using the outer peripheral portion (side surface part) 26*d* that is bent forward. Note that the constricted portion 262 is one example of a "first constricted portion" according to a preferred embodiment of the present invention, and the bottom constricted portion 262*c* is one example of a "second constricted portion" according to a preferred embodiment of the present invention.

Moreover, two through-holes 263*a* and 263*b* are arranged so as to be spaced at a specified distance in the X direction in an area of the rear frame 26 other than the region 261 constituting the rear case. The through-hole 263*a* is provided in order allow a cable 211*b* that connects the drive circuit board 211 and the circuit board 28 to each other to pass from the front side (Y1 direction side) to the rear side (Y2 direction side) of the rear frame 26. Note that the cable 211*b* is one example of a "wiring line" according to a preferred embodiment of the present invention. In addition, the through-hole 263*b* is provided in order to allow a cable 221 that supplies power from the circuit board 27 to the light source 22 to pass from the front side (Y1 direction side) to the rear side (Y2 direction side) of the rear frame 26. Furthermore, the two through-holes 263*a* and 263*b* preferably have a rectangular or substantially rectangular shape as seen from the rear as shown in FIGS. 6 and 8. Moreover, the two through-holes 263*a* and 263*b* are disposed in positions below the drive circuit board 211 that do not overlap with the drive circuit board 211 as seen from the rear as shown in FIG. 8. That is, the two through-holes 263*a* and 263*b* are located at positions in which the drive circuit board 211 is not exposed via the two through-holes 263*a* and 263*b*. In addition, the through-hole 263*a* (263*b*) is provided such that a portion thereof overlaps with the circuit board 28 (27) as seen from the rear. Furthermore, the two through-holes 263*a* and 263*b* are provided in positions covered by the cover member 4 from the rear as shown in FIG. 3.

In the present preferred embodiment, as was described above, by providing the rear frame 26 which is preferably made of a conductive material that covers, in the region 261 constituting the rear case, the sides and the rear of the drive circuit board 211 that drives the liquid crystal panel 21 disposed on the rear surface of the liquid crystal panel 21, both the sides and the rear of the drive circuit board 211 are covered by the rear frame 26, so unnecessary radiation emitted from the drive circuit board 211 can be prevented from leaking to the outside. Consequently, there is no need to cover the drive circuit board 211 with the cover member 4 provided behind the rear frame 26, so it is possible to reduce the size of the cover member 4. That is, because it is possible to provide the cover member 4 which covers only the area of the rear frame 26 other than the region 261 constituting the rear case, the size of the cover member 4 can be reduced. Accordingly, in this liquid crystal television 100, unnecessary radiation (EMI) emitted from the drive circuit board 211 that drives the liquid crystal panel 21 can be prevented from leaking to the outside while achieving a reduction in the size of the cover member 4.

Moreover, in the present preferred embodiment, as was described above, the through-hole 263*a* that allows the cable 211*b* connected to the drive circuit board 211 to pass from the front side to the rear side of the rear frame 26 is provided in the rear frame 26, and the through-hole 263*a* is provided in a position that does not overlap with the drive circuit board 211 as seen from the rear and in the area covered by the cover member 4 from the rear. This makes it possible to prevent unnecessary radiation emitted from the drive circuit board 211 from leaking to the outside via the through-hole 263*a* even though the through-hole 263*a* arranged to allow the cable 211*b* connected to the drive circuit board 211 to pass is provided in the rear frame 26. Therefore, it is possible to prevent a drop in the shielding function of the rear frame 26. In addition, the through-hole 263*a* can be covered over by the cover member 4.

Furthermore, in the present preferred embodiment, as was described above, the circuit board 28 is provided which is attached to the area on the rear surface 26*b* of the rear frame other than the region 261 constituting the rear case and which is covered by the cover member 4 from the rear, and the cable 211*b* is used to connect the drive circuit board 211 disposed on the front side of the rear frame 26 and the circuit board 28 attached to the rear surface 26*b* of the rear frame 26 to each other via the through-hole 263*a*. Consequently, the drive circuit board 211 disposed on the front side of the rear frame 26 and the circuit board 28 attached to the rear surface 26*b* of the rear frame 26 can be connected easily via the through-hole 263*a* by the cable 211*b*, and it is also possible to cover over both the through-hole 263*a* and the circuit board 28 attached to the rear surface 26*b* of the rear frame 26 with the cover member 4.

Moreover, in the present preferred embodiment, as was described above, the outer peripheral portion 26*d* of the rear frame 26 is arranged so as to extend forward, and the rear frame 26 is configured such that the sides of the drive circuit board 211 are covered by the outer peripheral portion 26*d* and also such that the rear of the drive circuit board 211 is covered by the area around the outer peripheral portion. If such a configuration is adopted, both the sides and the rear of the drive circuit board 211 are covered easily by the region 261 constituting the rear case, so unnecessary radiation can be effectively prevented from leaking to the outside, thus making it possible to improve the shielding function.

In addition, in the present preferred embodiment, as was described above, the constricted portion 262 preferably having a concave shape that sinks in toward the rear is provided in the area of the rear frame 26 made of a sheet metal around the outer peripheral portion constituting the rear case, and the drive circuit board 211 is covered from the rear by the constricted portion 262. Consequently, the mechanical strength around the outer peripheral portion of the rear frame 26 can be increased by the constricted portion 262, so it is possible to prevent unnecessary radiation from leaking to the outside while ensuring the strength required as the rear case in the region 261 of the rear frame 26 constituting the rear case. Furthermore, by providing the constricted portion 262 in a concave shape that sinks in toward the rear, even in cases where the drive circuit board 211 is disposed so as to protrude rearward, this drive circuit board 211 disposed in a protruding manner can be covered easily by the concave-shaped constricted portion 262.

Moreover, in the present preferred embodiment, as was described above, the drive circuit board 211 is disposed so as to extend along one side of the rectangular or substantially rectangular liquid crystal panel 21, and the upper-side (Z1 direction-side) portion 262a of the constricted portion 262 of the rear frame 26 extends in the direction of extension of the drive circuit board 211. Consequently, even when the drive circuit board 211 that extends along one side of the liquid crystal panel 21 is disposed so as to protrude rearward, this drive circuit board 211 can be reliably covered from the rear by the constricted portion 262, so unnecessary radiation emitted from the drive circuit board 211 can be further prevented from leaking to the outside.

In addition, in the present preferred embodiment, as was described above, the bottom constricted portion 262c that extends in the direction of extension of the upper-side (Z1 direction-side) portion 262a of the constricted portion 262 is provided on the bottom portion of the upper-side (Z1 direction-side) portion 262a of the constricted portion 262. Consequently, even when the surface area of the bottom portion of the constricted portion 262 is increased, which tends to deform the bottom portion, the mechanical strength of the bottom portion is increased by the bottom constricted portion 262c. Therefore, it is possible to ensure the strength required as the rear case by inhibiting the deformation of the bottom portion of the constricted portion 262 around the outer peripheral portion constituting the rear case.

Furthermore, in the present preferred embodiment, as was described above, the rear frame 26 is configured such that the sides and the rear of the drive circuit board 211 attached to the rear surface of the hold plate 25 are covered by the region 261 constituting the rear case. Consequently, the hold plate 25 can be used to support the drive circuit board 211 in a stable manner, and the rear frame 26 can be used to cover the stably supported drive circuit board 211, which makes it possible to prevent unnecessary radiation (EMI) emitted from the drive circuit board 211 from leaking to the outside.

Note that the preferred embodiments disclosed herein merely constitute examples in all respects and should be considered to be non-restrictive. The scope of the present invention is indicated not by the description of the aforementioned preferred embodiments but rather by the scope of the patent claims, and includes all modifications with an equivalent meaning to the scope of the claims and within the scope of the claims.

For instance, in the aforementioned preferred embodiments, an example was shown in which the "display device" of the present invention is applied to a liquid crystal television, but the present invention is not limited to this. The present invention can also be applied to a display device other than a liquid crystal television, for example, to a monitor for a personal computer.

Moreover, in the aforementioned preferred embodiments, an example was shown in which the drive circuit board as the first circuit board of the present invention is preferably disposed so as to extend along one side of the liquid crystal panel (display panel) on the upper side thereof, but the present invention is not limited to this. In the present invention, the first circuit board may also be disposed so as to extend along one side of the display panel other than the upper side, or the first circuit board may also be disposed on the rear surface of the display panel without being formed in a shape that extends in a specified direction.

In addition, in the aforementioned preferred embodiments, an example was shown in which the display panel of the present invention is preferably applied to a liquid crystal panel, but the present invention is not limited to this. The display panel of the present invention can also be applied widely to a display panel other than a liquid crystal panel.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A display device comprising:
   a display panel;
   a first circuit board that drives the display panel and that is disposed on a back surface side of the display panel;
   a rear case composed of a conductive material and disposed on a back surface side of the first circuit board on a side opposite from a front surface that faces the display panel; and
   a power supply circuit board disposed on a back surface side of the rear case on a side opposite from a front surface of the rear case that faces the first circuit board.

2. The display device according to claim 1, wherein
   the rear case includes a through-hole arranged to allow a wiring line connected to the first circuit board to pass from a front side to a rear side of the rear case; and
   the through-hole is provided in a position that does not overlap with the first circuit board as seen from a rear of the display device and in an area that is covered by the cover member from the rear of the display device.

3. The display device according to claim 2, further comprising a second circuit board that is attached to an area of the rear surface of the rear case other than the region constituting the rear case and that is covered by the cover member from the rear, and the wiring line is configured so as to connect the first circuit board disposed on the front side of the rear case and the second circuit board attached to the rear surface of the rear case to each other via the through-hole.

4. The display device according to claim 1, wherein the rear case is arranged such that the outer peripheral portion constituting the rear case extends forward and covers the sides of the first circuit board with the outer peripheral portion and also covers a rear of the first circuit board with the area around the outer peripheral portion constituting the rear case.

5. The display device according to claim 1, wherein the rear case is made of a sheet metal, includes a first constricted portion with a concave shape that sinks in toward a rear of the display device in the area around the outer peripheral portion constituting the rear case, and is arranged to cover from the rear of the display device the first circuit board with the first constricted portion.

6. The display device according to claim 5, wherein
the display panel has a rectangular or substantially rectangular shape in plan view;
the first circuit board extends along one side of the rectangular or substantially rectangular display panel; and
the first constricted portion of the rear case extends in a direction of extension of the first circuit board.

7. The display device according to claim 6, wherein a second constricted portion that extends in the direction of extension of the first constricted portion is provided on a bottom portion of the first constricted portion.

8. The display device according to claim 1, further comprising an optical member disposed on the rear surface of the display panel; and
a support member that supports the optical member from a rear of the display device; wherein
the first circuit board is attached to the rear surface of the support member; and
the rear case covers the sides and a rear of the first circuit board attached to the rear surface of the support member with the region constituting the rear case.

9. The display device according to claim 1, wherein the first circuit board and the power supply circuit board are disposed so as not to overlap with each other as seen from a rear of the display device.

10. The display device according to claim 9, wherein the rear case includes a through-hole configured to pass a wiring line connected to the first circuit board from a front side to a rear side of the rear case, and the through-hole is provided in a position that does not overlap with the first circuit board and the power supply circuit board as seen from a rear of the display device.

11. A television comprising:
a receiver that receives a television broadcast;
a display panel that displays the television broadcast received by the receiver;
a circuit board that drives the display panel and that is disposed on the rear surface of the display panel;
a rear case composed of a conductive material and disposed on a back surface side of the circuit board that drives the display panel on a side opposite from a front surface that faces the display panel; and
a power supply circuit board disposed on a back surface side of the rear case on a side opposite from a front surface of the rear case that faces the circuit board that drives the display panel.

* * * * *